United States Patent [19]

Freeman

[11] 3,947,972
[45] Apr. 6, 1976

[54] REAL TIME CONVERSATIONAL STUDENT RESPONSE TEACHING APPARATUS

[76] Inventor: Michael J. Freeman, 110 De Haven Drive, Yonkers, N.Y. 10703

[22] Filed: Mar. 20, 1974

[21] Appl. No.: 453,110

[52] U.S. Cl. .................. 35/8 A; 35/9 A; 40/28.1; 360/121
[51] Int. Cl.² ........................................ G09B 7/04
[58] Field of Search .............. 35/8 A, 9 R, 9 A, 9 B, 35/35 C; 40/28.1, 28.3, 106.3, 28.2; 200/5 A; 360/121

[56] References Cited
UNITED STATES PATENTS

| | | | |
|---|---|---|---|
| 2,871,593 | 2/1959 | Roberts | 40/28.3 |
| 3,131,497 | 5/1964 | Rogers | 40/28.3 |
| 3,171,107 | 2/1965 | Rogers | 360/121 |
| 3,255,536 | 6/1966 | Livingston | 35/9 A |
| 3,484,950 | 12/1969 | Serrell et al. | 35/9 A |
| 3,502,795 | 3/1970 | Camras | 360/121 X |
| 3,664,037 | 5/1972 | Budnik et al. | 35/9 A |
| 3,678,424 | 7/1972 | Iwashima et al. | 200/5 A X |

Primary Examiner—Richard C. Pinkham
Assistant Examiner—Vance Y. Hum
Attorney, Agent, or Firm—Hubbell, Cohen, Stiefel & Gross

[57] ABSTRACT

A real time conversational student response teaching apparatus comprising a magnetic storage medium, such as a tape, having a plurality of audio tracks having audio information stored thereon for selective playback therefrom. The storage medium contains information stored on each track in a plurality of reproducible information segments, each of which comprises a complete message which is reproducible directly in response to the selection of the track upon which the segments are stored. One of the tracks, preferably a centrally located track having a greater track width than the others, contains interrogatory messages and associated multiple choice selectible responses to a particular interrogatory message while a plurality of the other tracks contain responsive messages related in real time and content to the interrogatory messages in a conversational real time environment. The responsive messages correspond to the multiple choice selectible responses, only one of these responsive messages comprising the correct selectible responsive message to a particular real time related interrogatory message, with the other real time and content related message comprising instructional messages corresponding to selection of an incorrect responsive message. A different one of the multiple choice selectible responsive message containing tracks contains the correct responsive message to at least a different one of the interrogatory messages.

8 Claims, 10 Drawing Figures

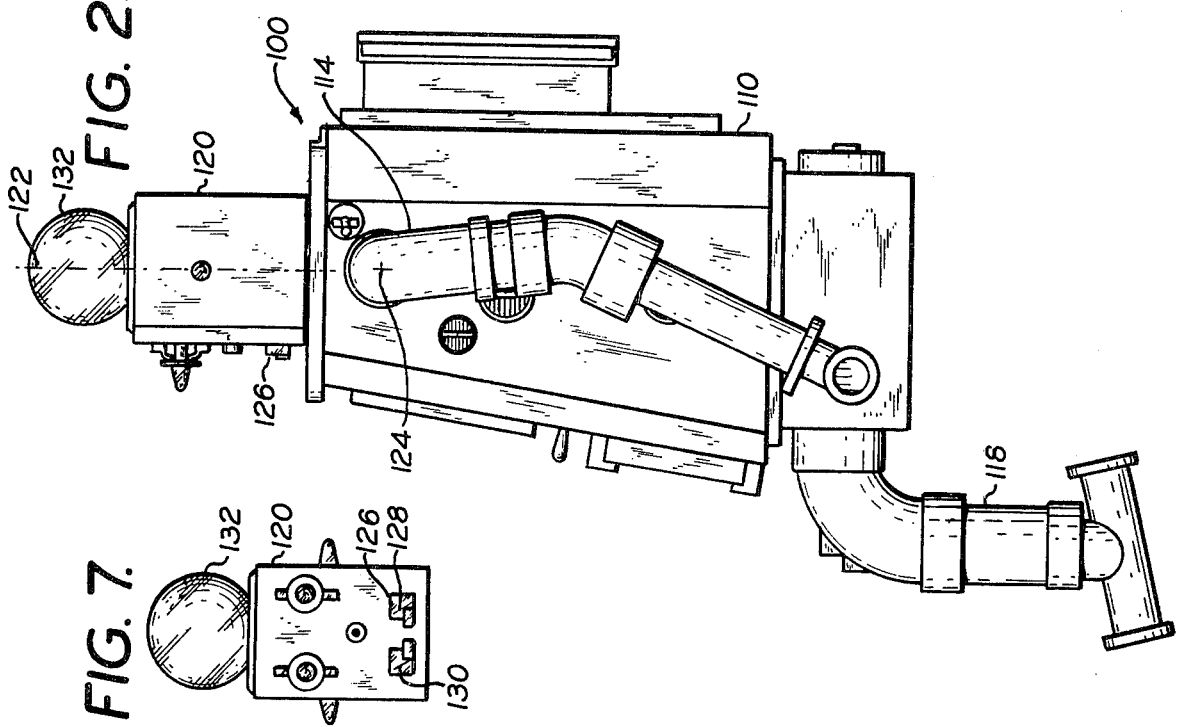
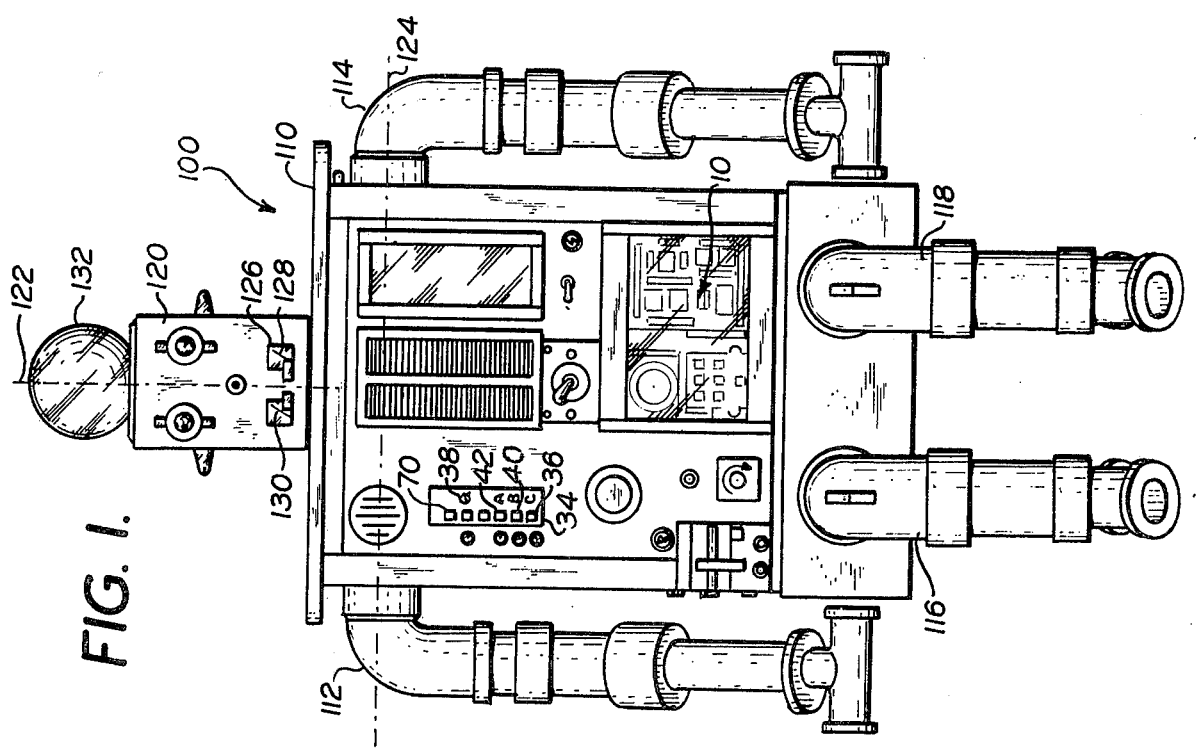

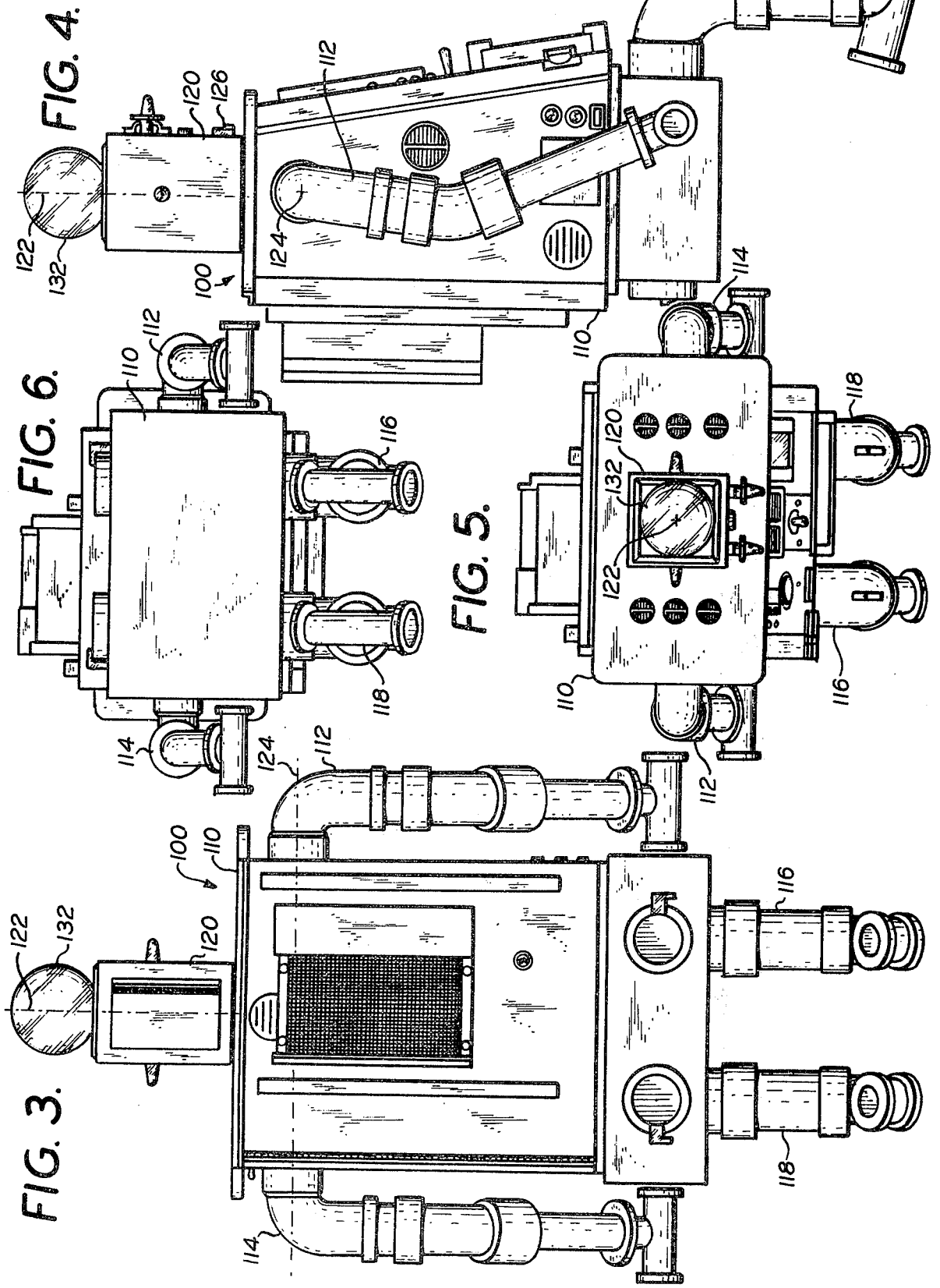

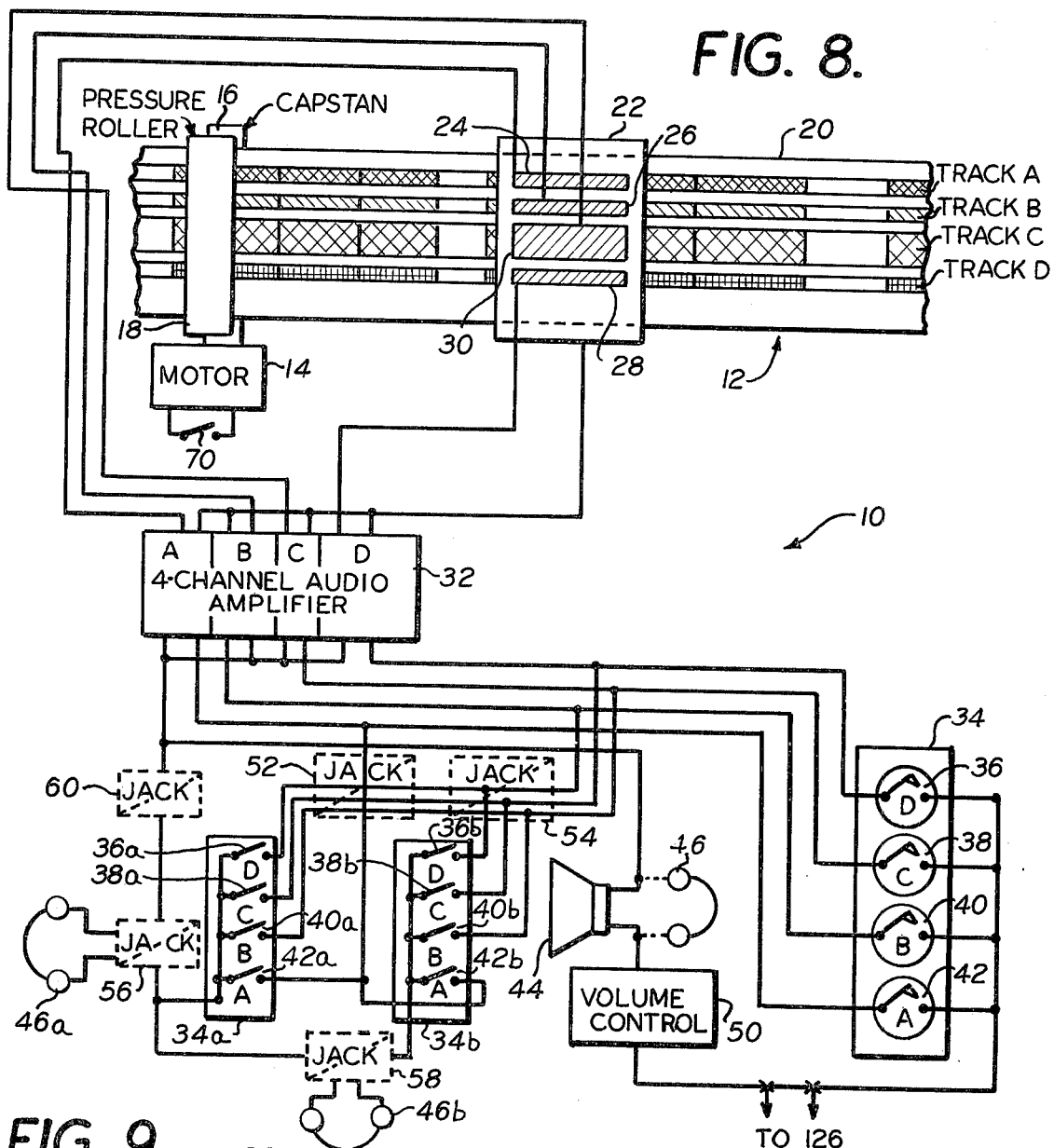
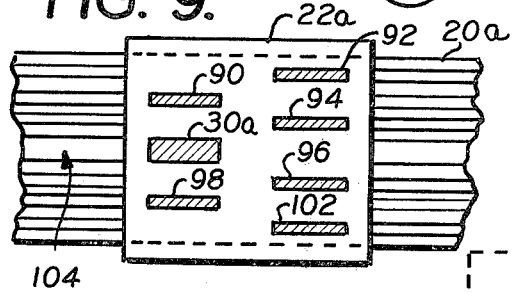
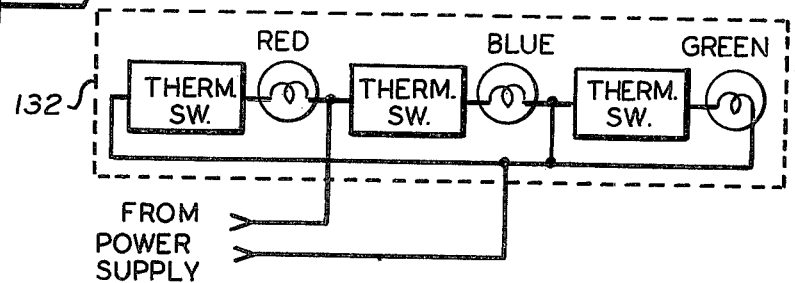

REAL TIME CONVERSATIONAL STUDENT RESPONSE TEACHING APPARATUS

BACKGROUND OF THE INVENTION

1 Field of the Invention

The present invention relates to student response teaching apparatus capable of providing a real time conversational response.

2. Description of the Prior Art

Multiple choice student response systems are well known, such as exemplified by the systems disclosed in U.S. Pat. Nos. 3,665,615, 3,245,157; 3,575,861; 3,284,923; 3,538,621 and 3,477,144. These prior art student response systems, however, are complex and normally require the employment of a control circuit so as to derive correct from incorrect student responses, such as by comparison of electric signals on a tape with modulating frequencies produced by a program logic control unit, as in the system disclosed in U.S. Pat. No. 3,708,891. These prior art systems employ logic control units, such as, by way of example, in addition to the above, that disclosed in U.S. Pat. Nos. 3,666,872 and 3,535,797. Furthermore, these prior art student response systems in which multiple students respond to a common centrally provided interrogatory, are normally, common scoring systems and do not enable each student to independently receive a different conversational audio response dependent on the particular multiple choice selection that the student has made. Thus, the majority of presently available prior art student response teaching systems require considerable complexity in order to provide a satisfactory response in a multiple student environment, as well as such a real time student response system for individualized student teaching. Prior art attempts to simplify these systems, such as the type of system disclosed in U.S. Pat. No. 3,284,923 or 3,665,615 still involve a complex stepping system for providing student response to a selected interrogatory.

SUMMARY OF THE INVENTION

The present invention is a real time conversational student response teaching apparatus for providing a real time multiple choice selection and determination of correct student response to an interrogatory message stored on a multitrack storage medium, such as a magnetic tape, directly in a conversational response to the selection of one of the plurality of other tracks containing a responsive message, only one of the responsive messages being the correct responsive message while the other responsive messages are instructional messages provided in response to selection of an incorrect responsive message. The interrogatory messages and the responsive messages are stored on the magnetic tape so as to be related in real time and content to one another in a conversational real time environment. The teaching apparatus comprises the magnetic storage medium having a plurality of co-extensive audio tracks capable of having audio information stored thereon for audio playback therefrom; a multitrack audio playback means, such as a multitrack audio playback head, adjacent the multitrack storage medium and in alignment therewith for selectively reproducing the stored audio information from each of the tracks; multiple choice selection means, such as magnetic proximity switches or conventional push button switches, operatively connected to the playback head for directly selecting one of the tracks for reproducing the information stored thereon; the audio output means, such as a conventional loudspeaker or earphones, operatively connected to the playback head and the direct selection means for directly providing the reproduced selected track information as an audio output therefrom.

The information is stored on each track in a plurality of reproducible information segments, each of which comprises a complete message reproducible by the playback head directly in response to the selection of the track upon which the segments are stored. One of the tracks, preferably the centrally located track for the tape, contains interrogatory messages and associated multiple choice selectible responses to a particular interrogatory message stored thereon. This track preferably has a greater track width, such as twice the normal width, as compared to the other tracks for minimizing signal distortions, such as due to physical distortions in the tape. The other tracks preferably contain responsive messages stored thereon which are related in real time and content to the interrogatory messages stored on the interrogatory track and corresponding to the multiple choice selectible responses. A different one of the multiple choice selectible responsive message containing tracks contains the correct responsive message to at least a different one of the interrogatory messages to enhance the validity of the multiple choice selection process.

The teaching apparatus preferably provides a non-human robot-like audio response as the conversational response for enhancing the educational value of the teaching apparatus, and accordingly, the system is preferably housed in a simulated robot-like housing. In accordance therewith, the magnetic storage tape is played back at an associated playback rate which is greater than the rate at which the information messages thereon were recorded, thereby producing a clear, distinct high pitched non-human robot-like sounding audio response, such playback rate being substantially 1-and-½ inches per second whereby distortion in the non-human audio conversational response, such as due to wow and flutter, are minimized. A plurality of students may simultaneously independently respond to common interrogatory messages and directly receive an individualized conversational response dependent on the multiple choice selection made by the student. This is accomplished by having a plurality of selection means, one per student, being connected in parallel to the common playback head with each selection means having an associated audio output device, such as earphones. If desired, the robot-like appearance of the teaching apparatus and the educational value thereof may be enhanced by the use of a simulated movable mouth as well as the use of a globe lamp containing randomly selectible primary colored bulbs so as to reproduce the colors of the rainbow.

BRIEF DESCRIPTION OF DRAWINGS

FIG. 1 is a front elevational view of a preferred robot-like housing for the conversational teaching apparatus of the present invention;

FIG. 2 is a side elevational view of the apparatus shown in FIG. 1 from one side thereof;

FIG. 3 is a rear elevational view of the housing illustrated in FIG. 1;

FIG. 4 is a side elevational view of the housing illustrated in FIG. 1 from the opposite side of that of FIG. 2;

FIG. 5 is a top plan view of the housing illustrated in FIG. 1;

FIG. 6 is a bottom plan view of the housing illustrated in FIG. 1;

FIG. 7 is a fragmentary elevational view of the head of the robot-like housing illustrated in FIG. 1 showing the mouth thereof in a different position;

FIG. 8 is a diagrammatical illustration, partially in schematic, of the selection and playback portions of the teaching apparatus of the present invention of the type housable in the housing of FIG. 1;

FIG. 9 is a diagrammatic illustration of a typical preferred multitrack head arrangement used for the teaching apparatus of FIG. 8; and FIG. 10 is a schematic of the globe lamp portion of the robot-like housing illustrated in FIG. 1.

DETAILED DESCRIPTION OF THE PREFERRED EMBODIMENT

Referring now to the drawings in detail and initially to FIG. 8 thereof, the conversational real time teaching apparatus of the present invention, generally referred to by the reference numeral 10, shall be described. The teaching apparatus of the present invention preferably utilizes a conventional multitrack magnetic tape recorder 12, such as one utilizing a conventional capstan drive employing a drive motor 14, a capstan 16 and a pressure roller 18 for driving a multitrack magnetic storage medium 20 past a multitrack playback head 22. As shown and preferred in FIG. 8, the multitrack playback head 22 is preferably conventional with the exception that the head width 30 associated with one of the tracks of the multitrack tape 20 is greater in width that that of the head widths 24, 26 and 28 associated with the other tracks of the multitrack tape 20. Preferably these other head widths 24, 26 and 28 in the example shown in FIG. 8 are equal in width while head width 30, associated with track C of the multitrack tape 20, is preferably twice the width of the head width associated with tracks A, B, and D, these head widths being head widths 24, 26 and 28, respectively.

The playback head 22 is preferably connected in conventional fashion to a conventional four channel audio amplifier 32 having one channel for each of the four tracks, A, B, C, D, in the example shown in FIG. 8, of multitrack tape 20 so as to conventionally playback the information stored on the respective audio track, playback head 22 preferably being a conventional audio playback head with the exception of the wider head width 30 for track C of multitrack tape 20 which is preferably a conventional multitrack audio tape. The output of audio amplifier 32 is preferably connected to a multiple choice selection device 34 which preferably comprises a plurality of conventional switches 36, 38, 40 and 42, with one switch being provided per channel or track of multitrack tape 20. In the example shown in FIG. 8, switch 36 corresponds to track B, switch 38 corresponds to track C, switch 40 corresponds to track B and switch 42 corresponds to track A, each of these switches being conventionally connected to the appropriate channel output of audio amplifier 32. These switches may be conventional push button switches having a mechanical interlock between the four switches so only one switch, 36, 38, 40 or 42 may be closed at a time, the switch being latched in the closed position when depressed and released when another switch is depressed of the grouping. Switches 36 through 42 are preferably connected between the output of the audio amplifier 32 and a conventional audio output device, such as a conventional loud-speaker 44 or a conventional pair of earphones 46 through a conventional volume control, such as a rheostat 50, the other terminal of the audio output device 44 or 46 being connected to the audio amplifier 32 to complete the circuit. Thus, when any one of switches 36 through 42 is closed, the output of the corresponding audio track A, B, C, or D, all of which are being provided to audio amplifier 32 by multitrack playback head 22, is selectively provided to the audio output device 44 or 46 to be heard by the student. Accordingly, as will be described in greater detail hereinafter, if interrogatory messages, such as true or false questions or multiple choice questions with information instructions to the student to select the appropriate responsive message track A, B, or D in response to the particular interrogatory contained on track C are stored in complete message information segments on track C of multitrack tape 20, and the student determines that track D contains the correct answer, he then presses push button switch 36 to complete the circuit between the D channel of audio amplifier 32 and the audio output device 44 or 46 and he will receive the audio response contained on track D.

The control illustrated in FIG. 8, represented by selection means 34, represents a master selection control and, by utilizing a conventional loud speaker 44, the responses selected may be heard by a group at large. If desired, individual earphones, such as earphones 46, may be utilized for private listening. As will be described in greater detail hereinafter, the interrogatory messages and the responsive messages stored on multitrack tape 20 are preferably related on the magnetic tape 20 in both real time and content to one another in a conversational real-time environment. Furthermore, if desired, selction means 34 may comprise a plurality of conventional magnetic proximity switches in place of push-button switches 36 through 42 which are operated in conventional fashion to select the appropriate audio channel or track of the multitrack tape 20 to be played back through the audio output device 44 or 46.

As also shown and preferred in FIG. 8, the teaching apparatus 10 may be simultaneously utilized by a plurality of users or students who may independently select a real-time determination of an appropriate response to the interrogatory message provided in common on track C, by way of example, so that student 1, represented by a conventional pair of earphones 46a may receive a different response than student 2 represented by another pair of conventional earphones 46b at substantially the same time to the same interrogatory message if different tracks or choices are selected. The selection means associated with earphone 46a is preferably identical in function and operation to selection means 34 as is the selection means associated with earphones 46b and are respectively given reference numerals 34a and 34b, the switches contained therein preferably being given reference numerals 36a through 42a for selection means 34a and 36b through 42b for selection means 34b. Switch 36a is connected in parallel to the channel A output of audio amplifier 32 as is switch 36b; switch 38a is connected in parallel to the output of channel C of audio amplifier 32 as is switch 38b; switch 40a is connected in parallel to the output of channel B of audio amplifier 32 as is switch 40b; and switch 42a is connected in parallel to the output of channel A of audio amplifier 32 as is switch 42b. As was previously mentioned, channels A through D correspond respectively to tracks A through D on multitrack tape 20 so that when the switch corresponding to the particular channel is closed then an audio output of the information stored on that track is provided through the appropriate earphone 46a or 46b directly in response to the closure of the appropriate switch 36a through 42a or 36b through 42b. As shown and preferred, selection means 34a and 34b are removably connectable to the audio amplifier 32 outputs through conventional plug-in type jacks 52 and 54, respectively and, similarly, earphones 46a and 46b are connected to switches 34a and 34b respectively, through conventional earphone jacks 56 and 58, respectively, the entire multi-student arrangement being conventionally jacked into audio amplifier 32 by an additional conventional plug-in type jack 60. Similarly, as was previously mentioned with respect to selection means 34, if desired push button switches 36a through 42a and 36b through 42b can be replaced by conventional magnetic proximity switches. If desired, any number of students could be independently connected into the apparatus 10 so as to individually receive real-time audio responses which the student may independently select in response to a common interrogatory message, only two such student stations being illustrated by way of example in FIG. 8.

Preferably, the original information stored on the magnetic tape 20 is recorded with a predetermined low recording tape speed, such as preferably one inch per second, preferably in conjunction with a conventional echo chamber or reverberator so as to record a non-human type voice to provide a robot-like voice to enhance the educational value of the teaching apparatus which is preferably housed in a robot-like appearing housing 100 of the type illustrated in FIGS. 1 through 7, to be described in greater detail hereinafter, for enhancing the educational value of the teaching apparatus. This magnetic tape 20 is preferably played back at a greater speed than the recording speed, such as preferably 1 ½ inches per second by capstan drive motor 14 so as to produce a high pitched non-human robot-like sounding voice that is clear and distinct, this higher frequency pitch preferably minimizing distortions due to wow and flutter at the predetermined low tape speed.

As was previously described, the magnetic tape 20 preferably contains an interrogatory message track, track C in the example shown in FIG. 8, which preferably houses all questions for tape 20, this track C preferably being physically located in the central portion of the tape and being double the normal width of the other tracks A, B and D, thereby minimizing the effects of physical distortions in the tape. The interrogatory messages stored on track C are preferably stored in a plurality of reproducible information segments each of which comprises a complete message reproducible by playback head 22 directly in response to the selection of track C by the selection means 34a 34b by closure of switch 42, 42a or 42b respectively. This complete information segment on track C preferably contains an interrogatory message, such as an educational question for the student and associated multiple choice selectable responses to the particular interrogatory message, such as a true or false response request or a request to select one of a plurality of multiple choices. Tracks A, B and D preferably contain responsive messages stored thereon which are related in real time and content to the particular interrogatory messages stored on track C and correspond to the multiple choice selectable responses. For example choice A would correspond to the real time and content related information stored on track A, choice B would correspond to such information stored on track B and choice D would correspond to such information stored on track B. The responsive message is provided directly in response to closure of the appropriate switches 42, 40 or 36 for selection means 34, 32a 40a or 36a for selection means 34a or 42b, 40b or 36b for selection means 34b. Preferably, only one of the responsive message tracks track A, track B, or track D contains the correct selectable responsive message to a particular real time related interrogatory message being reproduced from track C and stored thereon. The responsive messages and the interrogatory messages are preferably related in real-time and content to one another in a conversational real-time environment so as to provide an enhanced educational value to the student, such as in the preferred robot-like environment illustrated in FIGS. 1 through 7. For a particular real time related interrogatory message, the tracks containing the incorrect responsive messages for the particular interrogatory message preferably contain instructional messages corresponding to selection of an incorrect responsive message which are related in real time and content to the particular interrogatory message contained on track C. For example, if the student selects the least correct answer of the three choices, assuming it is a three choice multiple choice question, then the responsive message contained on that track can provide the student with additional information or additional work to be done to clarify his misunderstanding and, similarly, the other incorrect responsive messages for that particular interrogatory message contained on the tracks other than the correct responsive message track for that particular interrogatory message may contain instructional or informational messages which vary in degree depending on just how incorrect the multiple choice selection made by the student is. All of these tracks A through D are simultaneously played back through playback head 22 in real time, any one of these tracks capable of being selected in real time and all of these tracks being related in real time and content, as previously mentioned, in a conversational manner, as will be described in greater detail hereinafter. Furthermore, preferably, a different one of the responsive message tracks A, B, and D contains the correct responsive message to a different one of the interrogatory messages stored on track C so as to enhance the validity of the multiple choice selection system.

In order to understand the conversational responsive environment of the preferred teaching apparatus 10 of the present invention, a sample real time and content related information storage program for magnetic tape 20 is illustrated below, the stored information on the tape and the various tracks being spacially related to each other along the tracks in real time to provide the conversational responsive environment. In considering this example, it should be noted that if desired the teaching apparatus 10 may contain an additional switch 70 connected to the motor 14 for placing the tape 20 in a hold mode so that the student may stop the tape 20 from being moved in real time and perform activity relating to the interrogatory message contained on track C before selecting an appropriate responsive message track. As illustrated in the example below, the information contained on the interrogatory message track C may comprise an interrogatory or question, the choices available to the student corresponding to the various responsive message tracks which may be selected and then instructional information corresponding to the student's failure to make a selection in a predetermined time interval so as to enhance the conversational environment of the teaching apparatus 10, such conventional environment being possible due to the real-time simultaneous selectible playback of all tracks on the magnetic tape 20:

in real time and content, such time relation being illustratively shown in the above example by the illustrative alignment of the information illustrated above.

Now referring to FIG. 9, an illustrative example of another playback head 22 for audio playback of a seven track magnetic tape 20a is shown by way of example, the operation of the teaching apparatus 10 being preferably identical with that previously described with reference to FIG. 8 with the exception that the audio amplifier 32 in such an instance is preferably a seven channel audio amplifier and the number of available switches for selection is preferably seven as

Example

| | |
|---|---|
| (TRACK A) CHANNEL A | Push Question Button...I repeat Push Question Button |
| (TRACK B) CHANNEL B | Push Question Button...I repeat Push Question Button |
| (TRACK C) CHANNEL C | Question number one: From the "I Pledge Allegiance to the Flag" what does the word |
| (TRACK D) CHANNEL D | Push Question Button...I repeat Push Question Button |
| (TRACK A) CHANNEL A | You have not listened to me |
| (TRACK B) CHANNEL B | You have not listened to me |
| (TRACK C) CHANNEL C | *indivisible* mean. I will spell it for you. Write this down. I.N.D.I.V.I.S.I.B.L.E. |
| (TRACK D) CHANNEL D | You have not listened to me |
| (TRACK A) CHANNEL A | In the future you must push buttons when I say |
| (TRACK B) CHANNEL B | In the future you must push buttons when I say |
| (TRACK C) CHANNEL C | If you would like to look this word up in your dictionary push switch "X" to the right now..... |
| (TRACK D) CHANNEL D | In the future you must push buttons when I say |
| (TRACK A) CHANNEL A | You have chosen an answer too soon, push question button now...You have chosen an |
| (TRACK B) CHANNEL B | You have chosen an answer too soon, push question button now...You have chosen an |
| (TRACK C) CHANNEL C | (this puts the tape drive mechanism on hold). Is your answer A cannot be seen at night |
| (TRACK D) CHANNEL D | You have chosen an answer too soon, push question button now...You have chosen an |
| (TRACK A) CHANNEL A | answer too soon, Push question button now Not correct, not cor- |
| (TRACK B) CHANNEL B | answer too soon, Push question button now Correct, Cor- |
| (TRACK C) CHANNEL C | B cannot be divided or C great. Choose your answer NOW....You have not answered |
| (TRACK D) CHANNEL D | too soon, Push question button now.... Not correct, not cor- |
| (TRACK A) CHANNEL A | rect. Indivisible does not mean "cannot be seen at night" This word would be invisible. |
| (TRACK B) CHANNEL B | You are correct. Indivisible — as you can see on page 132 of your dictionary |
| (TRACK C) CHANNEL C | chosen, choose now.....You have still not chosen an answer. It is too late |
| (TRACK D) CHANNEL D | rect. Indivisible does not mean great. Look on page 132 of your dictionary for the |
| (TRACK A) CHANNEL A | Look on page 132 in your dictionary and here you will find the proper meaning to the |
| (TRACK B) CHANNEL B | indivisible does not mean cannot be divided. "One Nation under God that cannot be divided." |
| (TRACK C) CHANNEL C | just wait until I ask you another question. In the future you must always choose an |
| (TRACK D) CHANNEL D | correct answer. Here you will find that indivisible means cannot be divided. You |
| (TRACK A) CHANNEL A | word indivisible. I.N.D.I.V.I.S.I.B.L.E. Push question button now.....Push |
| (TRACK B) CHANNEL B | You are correct. Very good. Push question button now....Push question button now. |
| (TRACK C) CHANNEL C | answer as soon as possible. I will ask you another question in a moment... |
| (TRACK D) CHANNEL D | must be more careful next time to look words up. Push question button now... |

In the example given above, it should be noted that the information stored on each of the tracks A through D is continuous on the tape with blank spaces being provided at appropriate real time related intervals on the tape 20 for the appropriate track so as to relate the information stored on the various tracks A through D opposed to four, with one switch being provided for each audio channel output of the audio channel amplifier, one channel being provided per track. Similarly, as with reference to the head 22 illustrated in FIG. 8, the head width coresponding to the interrogatory message track 37a is preferably twice the width of the head width corresponding to the other tracks which contain the responsive messages, these head widths being head widths 90, 92, 94, 96, 98 and 102. Similarly, interrogatory message track 104 corresponding to head width 30a is preferably centrally located on the magnetic tape 20a. The balance of the construction and operation of the system with respect to the use of a seven track multitrack playback head 22a is preferably identical with that previously described with reference to the four track multitrack playback head 22 and will not be described in greater detail hereinafter. Furthermore, as will be apparent to one of ordinary skill in the art, a multitrack audio playback head may be utilized capable of providing any desired number of distinct audio channels or audio tracks, with such a head preferably having a head width corresponding to the interrogatory message containing track being twice the width of the head widths corresponding to the other tracks.

Referring now to FIGS. 1 through 7, the preferred robot-like housing for the teaching apparatus 10 of the present invention is shown. Preferably, the robot-like housing 100 comprises a body portion 110 having a pair of pivotally mounted arms 112 and 114 extending from said body portion, a pair of leg-like portions 116 and 118 extending from the body portion and a pivotally mounted head portion 120 mounted on the body portion. The head 120 is preferably pivotal about a vertical axis 122 and the arms 112 and 114 are preferably pivotal about a horizontal axis 124 in response to energization of a motor (not shown) in conventional fashion, such as by transmission of a high frequency signal so as to activate further movement of the arms 112 and 114 and the head 120 for a predetermined time interval in response to such a signal while an introductory message is provided to playback means 22 from one track, such as track A, of the tape 20. The robot-like appearance of the housing 100 is also preferably enhanced by a simulated movable mouth which is preferably provided by two VU ammeters which are connected in parallel to the volume control 50 and the selection means 34 (FIG. 8) so as to peak when an audio response is provided from any one of the audio amplifier 32 channels at the closure of the appropriate switch 36 and 42, the movement being simulated by the peak-to-peak movement of needles 128 and 130 of the meters 126 illustrated in FIGS. 1 and 7, FIG. 1 showing one peak or extreme position and FIG. 7 showing the other peak or extreme position, the meters preferably clicking in conventional fashion as the needle moves from one extreme position to the other. This moving needle and clicking sound provides the appearance of simulated mouth movement to the student to enhance the educational value of the robot-like housing 100 of the teaching apparatus 10. In addition, the robot-like housing 100 head portion 120 preferably contains a globe lamp 132 mounted on top thereof to provide a visual simulation of "thought," this globe preferably containing three conventional thermal switch lamps, such as conventional Christmas tree type on-off lamps, the lamps preferably comprising the three primary colors red, blue and green, as illustrated in FIG. 10. These lamps are contained in a frosted globe for globe lamp 132, preferably, and are randomly turned on and off by the associated thermal switch portions of the lamps to randomly provide all of the colors of the rainbow in a dynamic manner inside globe lamp 132 to visually simulate "thought."

By utilizing the teaching apparatus 10 of the present invention an interactive conversational real-time teaching apparatus may be provided in which, in a conversational manner, the teaching apparatus 10 may determine if a student has chosen an answer too quickly and tell the student verbally what he has done wrong and how to prevent making a similar mistake in the future, determine if a student is taking an excessive amount of time to choose his answer, determine if the student has not chosen an answer at all and provide appropriate instructional material or determine if the student has attempted to choose more than one answer at the same time and, if desired, provide a visual indication of this, all of these determinations being made in real time directly in response to the selection or lack of selection of an appropriate track of a multitrack tape without the intervention of any intermediate control or logic circuitry. The system may also assign specified time limits in which to respond and may monitor the specified time frame.

It is to be understood that the above described embodiment of the invention is merely illustrative of the principles thereof and that numerous modifications and embodiments of the invention can be derived within the spirit and scope thereof.

What is claimed is:

1. A real time conversational student response teaching apparatus comprising a magnetic storage medium having a plurality of coextensive audio tracks capable of having audio information stored thereon for audio playback therefrom; a multitrack audio playback means adjacent said multitrack storage medium and in alignment therewith for simultaneously obtaining said stored audio information from each of said coextensive tracks; multiple choice selection means operatively connected to said playback means for directly selecting one of said tracks for reproducing said selected information stored thereon; and audio output means operatively connected to said playback means and said direct selection means for directly providing said selected track information from said simultaneously obtained stored audio information for selectively reproducing said information as an audio output therefrom, said information being stored on each track in a plurality of reproducible information segments, each of said segments comprising a complete message reproducible by said playback means directly in response to the selection of said track upon which said segments are stored, one of said tracks stored information comprising interrogatory messages and associated multiple choice selectible responses to a particular interrogatory message, a plurality of said other tracks comprising responsive messages related in real time and content to said one track interrogatory messages and corresponding to said multiple choice selectible responses, only one of said plurality of other tracks comprising the correct selectible responsive message to a particular real time related interrogatory message, each track having an associated track width, said interrogatory message containing track having an associated track width greater than that of said other tracks, said playback means having a magnetic head width associated with each track for obtaining and reproducing said information stored thereon, said head width associated with said interrogatory message containing track being greater than said other track associated head widths, said associated head widths being respectively aligned with and spanning said associated tracks, said plurality of other tracks other than said correct responsive message track for said particular interrogatory message comprising instructional messages corresponding to selection of an incorrect responsive message which are related in real time and content to said one track particular interrogatory message and being selectively reproducibly provided by said playback means through said audio output means directly in response to selection of said incorrect responsive message by said selection means, a different one of said multiple choice selectible responsive message containing tracks containing the correct responsive message to at least a different one of said interrogatory messages, said multitrack storage medium being continuously scannable by said playback means for continuously providing said simultaneous reproduction in real time from said continuous scanning, said stored interrogatory messages and said responsive messages being spacially related to each other along said storage medium tracks in real time and further related in content to one another for providing a responsive message dependent on the track selected and the spacial position of said continuously scannable storage medium at the time of selection for providing a conversational real time environment, said magnetic storage medium comprising magnetic tape, said interrogatory message containing track being centrally disposed on said tape medium with respect to said other responsive message containing tracks, whereby a real time multiple choice selection and determination of correct student response to an interrogatory may be provided directly in a conversational response to the appropriate track selection and distortions in said reproducible interrogatory message due to physical distortions of said tape are minimized.

2. A real time conversational student response teaching apparatus in accordance with claim 1 wherein said interrogatory message containing track associated width is at least twice that of said other tracks, said playback means interrogatory message containing track associated head width correspondingly being at least twice that of said other track associated head widths.

3. A real time conversational student response teaching apparatus comprising a magnetic storage medium having a plurality of coextensive audio tracks capable of having audio information stored thereon for audio playback therefrom; a multitrack audio playback means adjacent said multitrack storage medium and in alignment therewith for simultaneously obtaining said stored audio information from each of said coextensive tracks; multiple choice selection means operatively connected to said playback means for directly selecting one of said tracks for reproducing said selected information stored thereon; and audio output means operatively connected to said playback means and said direct selection means for directly providing said selected track information from said simultaneously obtained stored audio information for selectively reproducing said information as an audio output therefrom, said information being stored on each track in a plurality of reproducible information segments, each of said segments comprising a complete message reproducible by said playback means directly in response to the selection of said track upon which said segments are stored, one of said tracks stored information comprising interrogatory messages and associated multiple choice selectible responses to a particular interrogatory message, a plurality of said other tracks comprising responsive messages related in real time and content to said one track interrogatory messages and corresponding to said multiple choice selectible responses, only one of said plurality of other tracks comprising the correct selectible responsive message to a particular real time related interrogatory message, each track having an associated track width, said interrogatory message containing track having an associated track width greater than that of said other tracks, said plurality of other tracks other than said correct responsive message track for said particular interrogatory message comprising instructional messages corresponding to selection of an incorrect responsive message which are related in real time and content to said one track particular interrogatory message and being selectively reproducibly provided by said playback means through said audio output means directly in response to selection of said incorrect responsive message by said selection means, a different one of said multiple choice selectible responsive message containing tracks containing the correct responsive message to at least a different one of said interrogatory messages, said multitrack storage medium being continuously scannable by said playback means for continuously providing said simultaneous reproduction in real time from said continuous scanning, said stored interrogatory messages and said responsive messages being spacially related to each other along said storage medium tracks in real time and further related in content to one another for providing a responsive message dependent on the track selected and the spacial position of said continuously scannable storage medium at the time of selection for providing a conversational real time environment, whereby distortions in said reproducible interrogatory message due to physical distortions of said storage medium are miniminzed.

4. A real time conversational student response teaching apparatus in accordance with claim 3 wherein said interrogatory message containing track associated track width is at least twice that of said other tracks, said playback means interrogatory message containing track associated head width correspondingly being at least twice that of said other tracks, said playback means interrogatory message containing track associated head widths.

5. A magnetic storage medium for providing a reproducible conversational responsive message to a particular reproducible interrogatory message from a plurality of different selectable reproducible responsive messages stored thereon, said storage medium comprising a plurality of coextensive audio tracks having audio information stored thereon for audio playback therefrom, said information being stored on each track in a plurality of reproducible information segments, each of said segments comprising a complete message reproducible directly in response to selective playback of said track upon which said segments are stored, one of said tracks stored information comprising interrogatory messages and associated multiple choice selectible responses to a particular interrogatory message, a plurality of said other tracks comprising responsive messages related in real time and content to said one track interrogatory messages and corresponding to said multiple choice selectible responses, only one of said plurality of other tracks comprising the correct selectible responsive message to a particular real time related interrogatory message, each track having an associated track width, said interrogatory message containing track having an associated track width greater than that of said other tracks, said plurality of other tracks other than said correct responsive message track for said particular interrogatory message comprising instructional messages corresponding to selection of an incorrect responsive message which are related in real time and content to said one track particular interrogatory message and being selectively reproducibly providable directly in response to selection of an incorrect responsive message, a different one of said multiple choice selectible responsive message containing tracks containing the correct responsive message to at least a different one of said interrogatory messages, said stored interrogatory messages and said responsive messages being spacially related to each other along said storage medium tracks in real time and further related in content to one another for providing a responsive message dependent on the track selected and the real time of selection for providing a conversational real time environment, said magnetic storage medium comprising magnetic tape, said interrogatory message containing track being centrally disposed on said tape medium with respect to said other responsive message containing tracks, whereby a real time multiple choice selection and determination of correct student response to an interrogatory may be provided directly in a conversational response to the appropriate track selection and distortions in said reproducible interrogatory message due to physical distortions in said tape are minimized.

6. A magnetic storage medium in accordance with claim 5 wherein said interrogatory message containing track associated track width is at least twice that of said other tracks.

7. A magnetic storage medium for providing a reproducible conversational responsive message to a particular reproducible interrogatory message from a plurality of different selectable reproducible responsive messages stored thereon, said storage medium comprising a plurality of coextensive audio tracks having audio information stored thereon for audio playback therefrom, said information being stored on each track in a plurality of reproducible information segments, each of said segments comprising a complete message reproducible directly in response to selective playback of said track upon which said segments are stored, one of said tracks stored information comprising interrogatory messages and associated multiple choice selectible responses to a particular interrogatory message, a plurality of said other tracks comprising responsive messages related in real time and content to said one track interrogatory messages and corresponding to said multiple choice selectible responses, only one of said plurality of other tracks comprising the correct selectible responsive message to a particular real time related interrogatory message, each track having an associated track width, said interrogatory message containing track having an associated track width greater than that of said other tracks, said plurality of other tracks other than said correct responsive message track for said particular interrogatory message comprising instructional messages corresponding to selection of an incorrect responsive message which are related in real time and content to said one track particular interrogatory message and being selectively reproducibly providable directly in response to selection of an incorrect responsive message, a different one of said multiple choice selectible responsive message containing tracks containing the correct responsive message to at least a different one of said interrogatory messages said stored interrogatory messages and said responsive messages being spacially related to each other along said storage medium tracks in real time and further related in content to one another for providing a responsive message dependent on the track selected and the real time of selection for providing a conversational real time environment, whereby a real time multiple choice selection and determination of correct student response to an interrogatory may be provided directly in a conversational response to the appropriate track selection.

8. A magnetic storage medium in accordance with claim 7 wherein said interrogatory message containing track associated track width is at least twice that of said other tracks.

* * * * *